United States Patent Office 2,879,401
Patented Mar. 24, 1959

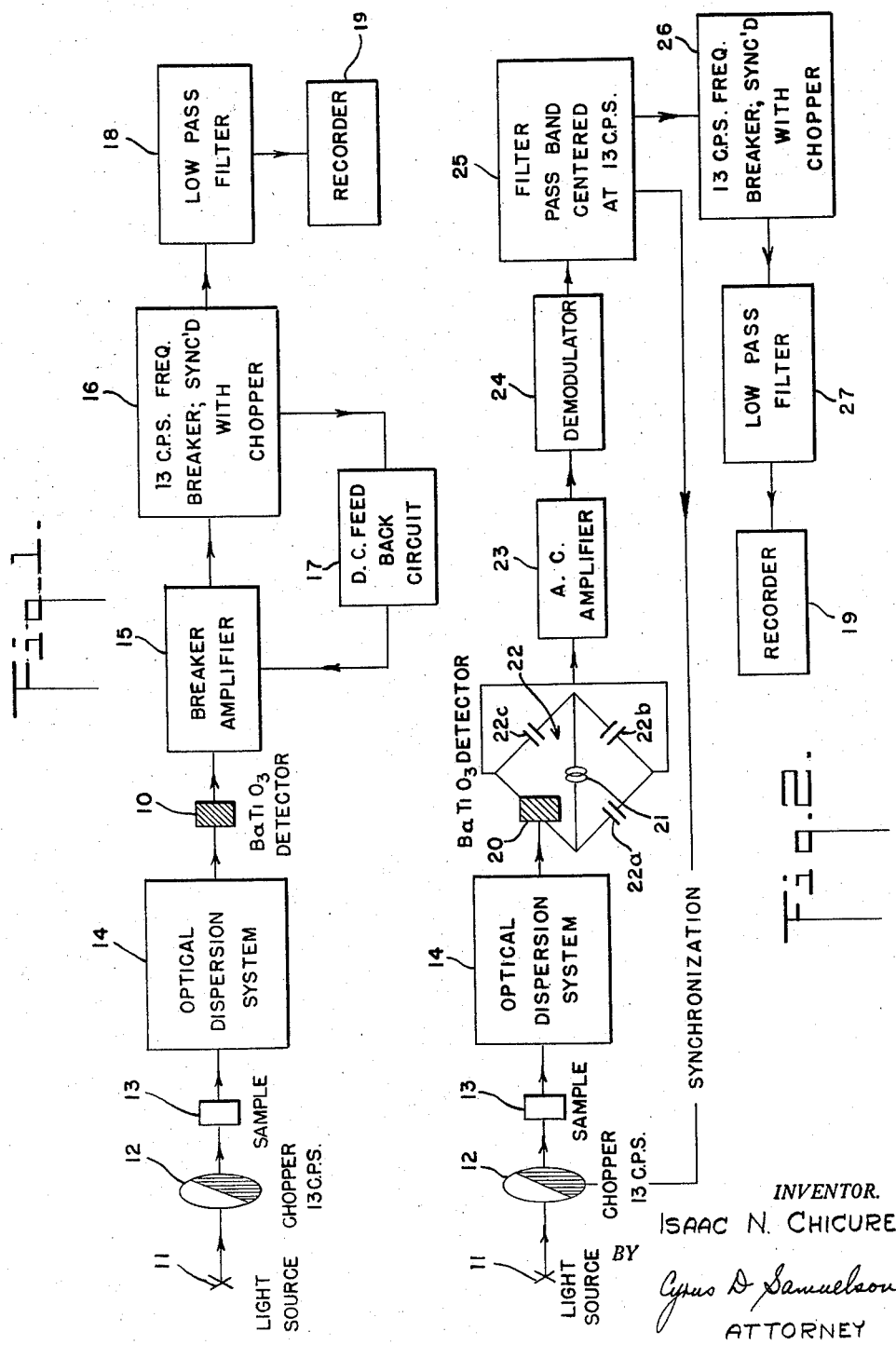

2,879,401

DEVICE FOR DETECTING ELECTROMAGNETIC RADIATIONS

Isaac N. Chicurel, Metuchen, N.J., assignor to Gulton Industries, Inc., Metuchen, N.J., a corporation of New Jersey Application December 3, 1954, Serial No. 472,982

15 Claims. (Cl. 250—83.3)

My invention relates to a device for detecting electromagnetic radiations and in particular to the employment of ceramic capacitors and ceramic ferroelectric elements as the detecting elements in such devices.

A principal object of my invention is to provide an electromagnetic radiation detector which is rugged and economical to produce.

A further object of my invention is to provide a stable, sensitive electromagnetic radiation detector.

A still further object of my invention is to provide a device for analyzing the characteristics of unknown materials.

Other objects and advantages of my invention will be apparent during the course of the following description.

Up to now it has not been possible to detect electromagnetic radiations except by the employment of fragile, sensitive elements and elaborate indicators such as wall galvanometers and the like. Most of the detectors, now in general use, are thermocouple elements which are fragile and easily fractured and rendered inoperative. The more sensitive detecting elements such as bolometers and the like, while they are extremely sensitive, are very expensive.

My invention contemplates the use of ceramic elements such as the titanates, steatites, and the like as the detecting element. For example, barium titanate may be manufactured by mass production methods into extremely thin capacitors of high dielectric constant. Barium titanate elements are also ferroelectric, that is, they may be polarized by the application of a direct current polarizing voltage such that they will retain the polarization and behave as piezoelectrics.

These polarized ferroelectric materials are commonly known as ceramic piezoelectrics. In either form these ceramic elements release an electric charge when their temperature is raised from a lower to a higher one. It is this characteristic of the barium titanate or other ceramic which is employed in my invention.

Barium titanate crystals are optically anisotropic when examined under crossed Nichols prisms while being illuminated by tungsten light. If the intensity of the illumination is increased the crystal structure is changed to the isotropic phase. This phase change is both rapid and reversible. The crystal has absorbed infrared radiation which has been converted into heat energy, sufficient to heat the crystalline material. This rise in the temperature of the crystal will cause the polarized barium titanate crystal to release a charge which may be amplified and measured. By applying known values of electromagnetic radiation to the crystal element and observing the output reading of the amplifying—measuring system, it is possible to calibrate the system so that unknown values of electromagnetic radiation may be measured.

If the heat energy applied to the crystal is high enough, the tetragonal structure of barium titanate at 20 degrees C. can be changed into the cubic form at 120 degrees C., the Curie point. The charge release as a function of temperature is dependent to a degree on the Curie point of the material employed so that it is possible to change the characteristics of the ceramic detecting element by varying the composition of the ceramic.

My invention may also be employed to examine the characteristics of unknown samples of material by examining the spectral characteristics of the material. In such a case the material to be studied is subjected to light which is impinged upon it through a low frequency chopper or interrupter. Since ceramic electro magnetic radiation detectors are non-selective, it is necessary to disperse the radiation from the unknown material through a prism so that the separate spectral elements may be analyzed and measured. Or, suitable filters of known spectral characteristics and transmission characteristics may be employed in place of the prism.

The relative ruggedness and ease of mass production of ceramics of titanate, steatite and like materials are ideal characteristics for an electromagnetic radiation detector.

In the accompanying drawings, forming a part of this application, and in which like numerals are employed to designate like parts throughout the same.

Figure 1 is a block diagram of an electromagnetic radiation detecting and measuring system for unknown material analysis utilizing a polarized ferroelectric barium titanate detector, and Figure 2 is a block diagram of an electromagnetic radiation detecting and measuring system for unknown material analysis utilizing a capacitive barium titanate detector.

In the drawings, wherein for the purpose of illustration, are shown preferred embodiments of my invention, the numeral 10 designates a barium titanate polarized ferroelectric detector, the numeral 11 designates a light source, the numeral 13 designates a sample of the unknown material, and the numeral 14 designates the optical dispersion system.

The numeral 15 designates the breaker amplifier, the numeral 16 designates the frequency breaker, the numeral 17 designates the D.C. feedback circuit, the numeral 18 designates the low pass filter, and the numeral 19 designates the recorder or other indicator. The numeral 20 designates the barium titanate capacitor, the numeral 21 designates the A.C. signal generator, the numeral 22 designates the capacitor bridge with fixed arms 22a, 22b and 22c, the numeral 23 designates the A.C. amplifier, and the numeral 24 designates the demodulator. The numeral 25 designates the filter, the numeral 26 designates the frequency breaker, and the numeral 27 designates the low pass filter.

The circuit of Figure 1 is employed to examine the spectral characteristics of an unknown sample of material 13 and utilizes a detector of polarized barium titanate or similar material. These polarized ferroelectrics release a charge when their temperature is changed. Light from a light source 11 is incident on sample 13 through a chopper 12 of low frequency, in this case I have chosen 13 cycles per second. The sample 13 emits its characteristic spectrum which is dispersed by optical dispersion system 14 which may be a prism, prism system, grating, grating system, filter arrangement, or the like. This dispersion system or filter arrangement is required in order to select the portion of the spectrum to be applied to detector 10. Detector 10 is subjected to a change in temperature due to the radiations impinged upon it and releases or generates an electrical charge. By suitable mechanical and optical arrangement of the optical dispersion system 14 and the detector 10, the complete spectral characteristic of the unknown sample 13 may be studied and measured.

The charge emitted by detector 10 is fed to breaker amplifier 15 and thence to frequency breaker 16. Frequency breaker 16 is synchronized with chopper 12 and a portion of the output of frequency breaker 16 is fed back through D.C. feed back circuit 17 to control breaker amplifier 15. The output of frequency breaker 16 is fed to low pass filter 18 and thence to recorder 19. Any other type of indicating device such as a meter may be employed in lieu of recorder 19.

Detectors of the same nature as detector 10 may be employed in electromagnetic radiation detecting systems of the non-selective type wherein the radiations to be detected and measured is impinged directly upon the barium titanate or like material detector itself. These detectors may also be employed in burglar alarms and the like of both the open and closed system types. In the open system, the radiation from the body to be detected closes the electronic circuits and causes an alarm to be actuated. In the closed system, the quiescent stage of the system is maintained by impinging electromagnetic radiation upon the detector such that the radiation is broken when the body to be detected comes between the source of radiation and the detector. In this case the alarm is actuated when the detector ceases to emit a charge due to the radiation.

The circuit of Figure 2 has the same purpose as that of Figure 1. This circuit utilizes a balanced bridge having as its arms capacitors 22 and barium titanate capacitive detector 20. The radiations from the unknown sample 13 are applied to detector 20 in the same manner as they are applied to detector 10. The output of A.C. signal generator 21 is fed into two opposite terminals of bridge 22 and the values of 22a, 22b, 22c and 20 are so adjusted that there is no voltage drop across the other two terminals of bridge 20 when there is no electromagnetic radiation impinging upon detector 20. When electromagnetic radiation is impinged upon detector 20 in the manner described for detector 10, the capacitance of detector 20 changes and there is a current flow to the input of A.C. amplifier 23. The output of A.C. amplifier 23 is fed to demodulator 24 where the carrier generated by A.C. signal generator 21 is removed and the resultant output is fed to filter 25. Filter 25 is a band pass filter whose pass band is centered at the frequency of the chopper 12. Some of the output of filter 25 is utilized to synchronize the frequency of chopper 12 and the remainder of the output is fed to frequency breaker 26 which is synchronized with chopper 12. The output of frequency breaker 26 is fed to low pass filter 27 and thence to recorder 19. Any other type of indicating device such as a meter may be employed in lieu of recorder 19. This system is calibrated in the same manner as that described for that of Figure 1.

Detectors of the same nature as detector 20 may be employed as non-selective electromagnetic radiation detectors wherein the radiations are impinged directly upon the detector and these detectors may be employed in burglar alarm systems and the like in a similar manner to that described for detector 10.

Ceramic electromagnetic radiation detectors of the types described and contemplated by my invention may also be used as temperature change detectors and the like.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. An electromagnetic radiation detector for analyzing materials comprising a ferroelectric temperature sensitive element; means for applying light rays onto the material being studied; said light rays being interrupted at a predetermined low frequency rate by interrupting means; means for impinging said interrupted light rays on said temperature sensitive element; amplifying means amplifying the electric output of said temperature sensitive element; the output of said amplifying means being fed to indicating means.

2. An electromagnetic radiation detector for analyzing materials as described in claim 9 wherein said ferroelectric temperature sensitive element is composed largely of barium titanate.

3. An electromagnetic radiation detector for analyzing materials comprising a temperature sensitive capacitive element; means for applying light rays onto the material being studied; said light rays being interrupted at a predetermined low frequency rate by interrupting means; means for impinging said interrupted light rays on said temperature sensitive element; amplifying means amplifying the electrical output of said temperature sensitive element; the output of said amplifying means being fed to indicating means.

4. An electromagnetic radiation detector comprising a ferroelectric temperature sensitive element; the input of amplifying means being connected to said ferroelectric temperature sensitive element and indicating means being connected to the output of said amplifying means.

5. An electromagnetic radiation detector comprising a ferroelectric temperature sensitive element composed largely of barium titanate; the input of amplifying means being connected to said ferroelectric temperature sensitive element and indicating means being connected to the output of said amplifying means.

6. An electromagnetic radiation detector comprising a temperature sensitive capacitive element; the input of amplifying means being connected to said temperature sensitive capacitive element, and indicating means being connected to the output of said amplifying means.

7. An electromagnetic radiation detector as described in claim 6 wherein said temperature sensitive capacitive element is composed largely of barium titanate.

8. An electromagnetic radiation detector comprising a normally balanced capacitive bridge; one of the arms of said bridge being a temperature sensitive capacitive element; voltage generating means applying voltage to two opposite terminals of said capacitive bridge; amplifying means being applied across the other two terminals of said capacitive bridge; said bridge being unbalanced upon the impinging of electromagnetic radiations on said temperature sensitive capacitive element; and indicating means connected across the other two opposite terminals of said bridge.

9. An electromagnetic radiation detector as described in claim 8 wherein said temperature sensitive capacitive element is composed largely of barium titanate.

10. An electromagnetic radiation detector comprising a polarized ferroelectric ceramic temperature sensitive element; the input of amplifying means being connected to said polarized ferroelectric ceramic temperature sensitive element and indicating means being connected to the output of said amplifying means.

11. An electromagnetic radiation detector for analyzing materials comprising a polarized ferroelectric ceramic temperature sensitive element; means for applying light rays onto the material being studied; said light rays being interrupted at a predetermined low frequency rate by interrupting means; means for impinging said interrupted light rays on said temperature sensitive element; the input of amplifying means being connected to said temperature sensitive element; and indicating means being connected to the output of said amplifying means.

12. A system for detecting the radiation from a radiation source comprising a ferroelectric ceramic temperature sensitive element, means for directing the energy from said source onto said temperature sensitive element to produce an electric potential from said element due to the heating of said element by said energy, amplifier means having its input connected to said element for amplifying said potential, and indicating means calibrated as a function of the intensity of said energy connected to the output of said amplifier means.

13. A system for detecting the radiation from a radiation source as described in claim 12 wherein said ferroelectric ceramic temperature sensitive element is polarized.

14. A system for detecting the radiation from a radiation source as described in claim 12 wherein said ferroelectric ceramic temperature sensitive element is capacitive.

15. A system for detecting the radiation from a radiation source as described in claim 12 wherein said ferroelectric temperature sensitive element is composed largely of barium titanate.

References Cited in the file of this patent

UNITED STATES PATENTS

| | | |
|---|---|---|
| 1,899,026 | Fessenden | Feb. 28, 1933 |
| 1,999,023 | Sharp et al. | Apr. 23, 1935 |
| 2,155,509 | Schroter | Apr. 25, 1939 |
| 2,451,572 | Moore | Oct. 19, 1948 |
| 2,473,556 | Wiley | June 21, 1949 |
| 2,496,879 | Lafferty | Feb. 7, 1950 |
| 2,515,931 | Six et al. | July 18, 1950 |
| 2,537,388 | Wooldridges | Jan. 9, 1951 |
| 2,616,989 | Hepp | Nov. 4, 1952 |
| 2,641,711 | Tommasi | June 9, 1953 |
| 2,678,400 | McKay | May 11, 1954 |
| 2,692,950 | Wallace, Jr. | Oct. 26, 1954 |
| 2,706,791 | Jacobs et al. | Apr. 19, 1955 |

UNITED STATES PATENT OFFICE

CERTIFICATE OF CORRECTION

March 24, 1959

Patent No. 2,879,401

Isaac N. Chicurel

It is hereby certified that error appears in the printed specification of the above numbered patent requiring correction and that the said Letters Patent should read as corrected below.

Column 3, line 34, for "bridge 20" read — bridge 22 —; column 4, line 6, for the claim reference numeral "9" read — 1 —.

Signed and sealed this 7th day of July 1959.

(SEAL)

Attest:

KARL H. AXLINE
Attesting Officer

ROBERT C. WATSON
Commissioner of Patents